3,642,929
RECOVERY OF ACETYLENE FROM GAS MIXTURES
Kurt Sennewald, Hurth-Hermulheim, Alexander Ohorodnik, Liblar, and Udo Dettmeier, Hurth-Hermulheim, Germany, assignors to Knapsack Aktiengesellschaft, Knapsack, near Cologne, Germany
No Drawing. Filed Sept. 10, 1970, Ser. No. 71,213
Claims priority, application Germany, Oct. 24, 1969,
P 19 53 520.7
Int. Cl. C07c *11/24, 11/12*
U.S. Cl. 260—679 A     5 Claims

ABSTRACT OF THE DISCLOSURE

Isolation and recovery of acetylene from an acetylene-containing gas mixture by intimately contacting the said gas mixture with a solvent, that is capable of selectively extracting and absorbing the acetylene, and expelling the absorbed acetylene from the solvent. The acetylene is more particularly isolated and recovered with the use of a solvent substantially consisting of dimethylphosphine oxide, methylethylphosphine oxide or diethylphosphine oxide.

---

The present invention relates to a process for isolating and recovering acetylene from an acetylene-containing gas mixture by intimately contacting the gas mixture with a solvent, that is capable of selectively extracting and absorbing the acetylene, and expelling the absorbed acetylene from the solvent.

The solvents or solvent mixtures used for the extractive isolation of acetylene from gas mixtures should meet three specifications. More particularly, they are required (a) to have a high dissolving power for acetylene, expressed by Bunsen's absorption coefficient $\alpha$,
(b) to have a selective dissolving power for acetylene, as compared with that they have for the further gas constituents (e.g. ethylene, $CO_2$, CO, $H_2$, ethane, methane), and
(c) to have a low vapor pressure.

The solvents used heretofore to that effect, which include acetone, alkylamidophosphates or dimethylformamide, for example, have been found merely partially to respond to the three requirements specified hereinabove (cf. German Pat. 823,638 and "Acetylene," vol. I, pages 85/86, by S. A. Miller, 1965, published by Ernest Benn Limited, London).

It has now been found that secondary phosphine oxides of the formula $R_1R_2HP=O$, in which $R_1$ and $R_2$ stand for methyl or ethyl radicals, can be used with particular advantage for the extractive isolation of acetylene from gas mixtures, as they substantially meet the three requirements specified hereinabove. These secondary phosphine oxides can be produced, for example, in the manner disclosed in U.S. patent application Ser. No. 849,141 filed Aug. 11, 1969, by reaction of the corresponding dialkylhalogenophosphines $R_1R_2P$—Hal with aqueous, non-oxidizing mineral acids.

Table 1 below shows the solubility values ($\alpha$-values, expressed in liters acetylene dissolved at S.T.P. per liter of solvent for an acetylene partial pressure of 760 mm. Hg) of acetylene in dimethylphosphine oxide (DMPO) and in dimethylformamide (DMF) as a function of temperature. Pure DMPO has a melting point of between 34 and 36° C., a boiling point of 54° C. under a pressure of 1 mm. Hg and a refractive index $n_D^{35}=1.4430$. Diethylphosphine oxide has a boiling point of between 47 and 48° C. under a pressure of 0.2 mm. Hg. The test data indicated in Table 1 below were obtained with the use of DMPO of substantially 98%. The minor proportions of contaminants therein cause the DMPO to become liquid at a temperature as low as 30° C.

TABLE 1

|  | 30° C. | 40° C. | 50° C. |
|---|---|---|---|
| $\alpha$-Values DMPO | 42.6 | 33.2 | 24.3 |
| (Vol./vol.) DMF | 24.0 | 19.4 | 13.0 |

It is possible for the DMPO to be diluted with water or DMF, and thereby to work at lower temperatures. For example, a solution of 94 weight percent DMPO and 6 weight percent $H_2O$ has an $\alpha$-value of 36 at 20° C., and a solution of 84 weight percent DMPO and 16 weight percent DMF has an $\alpha$-value of 55, whereas pure DMF has an $\alpha$-value of 34.6 at 20° C.

In Table 2 below there is compared the selectivity of acetylene with that of ethylene and carbon dioxide, and the vapor pressures of DMPO and DMF.

TABLE 2

|  | Vol. diss. $C_2H_2$: vol. diss. $C_2H_4$ | Vol. diss. $C_2H_2$: vol. diss. $CO_2$ | Vapor pressure 30° C. (mm. Hg) |
|---|---|---|---|
| 30° C.: |  |  |  |
| DMPO | 37:1 | 12:1 | 0.5 |
| DMF | 15:1 | 6.4:1 | 5.0 |

As can be seen from Table 1 and Table 2, DMPO distinguishes favorably over DMF in its high solubility, substantially greater selectivity and lower vapor pressure. DMPO and DMF were both tested in the same apparatus under identical conditions to have a reliable basis for comparison.

The process of the present invention provides for the use of the dialkylphosphine oxides in the form of pure substances, or in combination with further compounds. In view of their properties, they are particularly useful absorbents for acetylene in cylindrical pressure bottles, such as those used for acetylene/oxygen welding. Still further they can be used for the work-up of acetylene-containing gas mixtures to recover pure acetylene therefrom. The absorption should preferably be carried out at atmospheric or elevated pressure at temperatures of between 20 and 50° C. The acetylene dissolved in the solvent may successively be expelled therefrom at lower pressures, for example by relief to atmospheric pressure or under vacuum at temperatures of between 30 and 100° C.

The present invention relates more particularly to a process for isolating and recovering acetylene from an acetylene-containing gas mixture by intimately contacting the gas mixture with a solvent, that is capable of selectively extracting and absorbing the acetylene, and expelling the absorbed acetylene from the solvent, process wherein the solvent substantially consists of dimethylphosphine oxide, methylethylphosphine oxide or diethylphosphine oxide.

Further preferred features of the present invention provide (a) for the solvent to contain up to 10 weight percent water,
(b) for the solvent to contain up to 20 weight percent dimethylformamide,
(c) for the acetylene to be absorbed under pressures of between 1 and 10 atmospheres absolute and at temperatures of between 20 and 50° C., and
(d) for the acetylene to be desorbed (expelled) under pressures of between 0.001 and 1 atmosphere absolute and at temperatures of between 30 and 100° C.

We claim:

1. In a process for isolating and recovering acetylene from an acetylene-containing gas mixture by intimately contacting the said gas mixture with a solvent, capable of selectively extracting and absorbing the acetylene, and expelling the absorbed acetylene from the solvent, the improvement according to which the solvent substantially consists of a substance selected from the group consisting of dimethylphosphine oxide, methylethylphosphine oxide or diethylphosphine oxide.

2. The process as claimed in claim 1, wherein the solvent contains up to 10 weight percent water.

3. The process as claimed in claim 1, wherein the solvent contains up to 20 weight percent dimethylformamide.

4. The process as claimed in claim 1, wherein the acetylene is absorbed under pressures of between 1 and 10 atmospheres absolute and at temperatures of between 20 and 50° C.

5. The process as claimed in claim 1, wherein the acetylene is desorbed (expelled) under pressures of between 0.001 and 1 atmosphere absolute and at temperatures of between 30 and 100° C.

References Cited

UNITED STATES PATENTS

| | | | |
|---|---|---|---|
| 2,779,365 | 7/1957 | Reetz | 183—115 |
| 2,800,978 | 7/1957 | Howard | 183—115 |
| 2,779,365 | 7/1957 | Reetz | 183—115 |
| 3,004,629 | 10/1961 | Cottle | 183—115 |
| 2,722,206 | 12/1955 | Trementozzi | 252—1 |

FOREIGN PATENTS

| | | | |
|---|---|---|---|
| 823,638 | 7/1949 | Germany | 260—679 A |

OTHER REFERENCES

"Acetylene," vol. I, pp. 85 and 86, S. A. Miller, Ernest Benn Limited, London, England.

DELBERT E. GANTZ, Primary Examiner

J. M. NELSON, Assistant Examiner

U.S. Cl. X.R.

55—64; 260—677 A